United States Patent [15] 3,706,883
McIntyre [45] Dec. 19, 1972

[54] RADIOLOGICAL APPARATUS FOR MEASURING LENGTH WHICH COMPRISES TWO RELATIVELY MOVABLE RADIO OPAQUE MARKS

[72] Inventor: Kevin M. McIntyre, V. A. Hospital, 1400 V.F.W. Parkway, Boston, Mass. 02136

[22] Filed: Nov. 21, 1969

[21] Appl. No.: 878,761

[52] U.S. Cl.................................250/59, 250/65
[51] Int. Cl...................G03b 41/16, G01b 15/00
[58] Field of Search.........................250/59, 65

[56] References Cited

UNITED STATES PATENTS 2,650,308   8/1953   Catlin..........................250/59
3,001,070   9/1961   Davis...........................250/59

Primary Examiner—James W. Lawrence
Assistant Examiner—C. E. Church
Attorney—Charles Hieken

[57] ABSTRACT

An elongated probe including at least one segment of X-ray-opaque material of known length along the dimension parallel to the axis of the probe is used to provide a standard scale for dimensional determination of objects not accessible to direct measurement. The probe is brought into proximity to the object to be measured, X-rays illuminate the object and probe to produce an image, and the image size of the X-ray-opaque material, or of known intervals between adjacent X-ray-opaque segments, is compared with the image size of the object to be measured.

8 Claims, 6 Drawing Figures

PATENTED DEC 19 1972　　　　　　　　　　　　　　3,706,883

INVENTOR
KEVIN M. McINTYRE
BY
Wolf, Greenfield, Hieken & Sacks
ATTORNEYS

1

RADIOLOGICAL APPARATUS FOR MEASURING LENGTH WHICH COMPRISES TWO RELATIVELY MOVABLE RADIO OPAQUE MARKS

BACKGROUND OF THE INVENTION

The present invention relates in general to measuring and more particularly concerns dimensional determination of inaccessible objects by radiology. The invention is especially useful in accurately measuring key internal dimensions of a patient with X-rays easily and with relatively little additional expense.

In a typical prior art approach X-ray equipment or other radiation sources illuminate objects not accessible to direct measurement to measure, for example the internal dimensions of the heart, the thickness of the ventricular myocardium, etc., measuring the image and correcting for the distortion caused by nonparallel X-ray beams, and the position of the object relative to the energy source and the X-ray film or other recording of the image. Because the energy source radiates a nonparallel beam, the image size is not generally equal to the actual size of the object being measured. Manifestly, this prior art approach is difficult, of limited accuracy and subject to errors.

Accordingly, it is an important object of this invention to provide methods and means for easily and accurately measuring internal dimensions.

Another object of the invention is to provide a scale capable of being introduced into inaccessible locations and of providing a standard for direct in situ dimensional determinations. Other objects are to provide such a scale which permits direct reading of relevant dimensions from the radiated image, which provides a calibrated radio-opaque image of known dimensions, and which permits direct external adjustment of radio-opaque elements to permit measurement of objects through the amplitude of such adjustment.

SUMMARY OF THE INVENTION

According to the invention insertable means, such as an elongated probe, include at least one segment of radio-opaque material of known dimension. Other aspects of the invention feature a plurality of such segments of known size spaced at known intervals and in some cases a two-element probe having an outer tubular element surrounding an inner element adapted for axial movement with respect thereto whereby a known axial movement of the inner element with respect to the outer element produces non-radio-opaque windows of known size between radio-opaque segments of the inner element and radio-opaque segments of the outer element, which windows can be used as measurement standards.

A source of radiant energy illuminates the insertable means and the adjacent object to be measured to form an image of the object relative to that of the insertable means to calibrate the former with the latter.

Numerous other features, objects and advantages of the invention will become apparent from the following specification, when read in connection with the accompanying drawing in which:

DETAILED DESCRIPTION OF PREFERRED EMBODIMENTS

Figure 1:
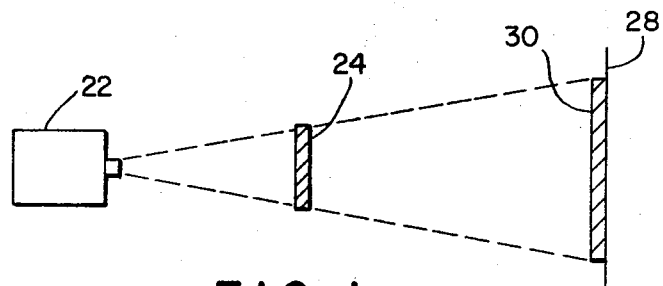
FIGS. 1 and 2 are schematic diagrams illustrating the problem of dimensional measurement using an energy source having a nonparallel pattern of radiation.

The basic problem of accurate in situ dimensional determination by X-rays or other radiation is illustrated in FIG. 1. An energy source, for example an X-ray phototube 22, illuminates object to be measured 24 to produce an image 30 upon the X-ray film or other recording medium 28. The nonparallel pattern of radiation causes the image 30 to be of different size than the object 24. Unless the exact spacing and angular relationship of the energy source, object to be measured, and image are known, it is not possible to determine the object size from the image size. As a practical matter, particularly for measurements within the human body, the necessary data is often not available, and consequently accurate in situ dimensional determination of object size is not practical.

Figure 2:
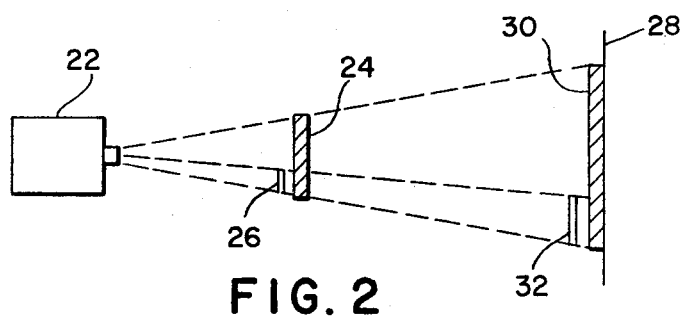

The basic physical principle utilized by the invention is illustrated in FIG. 2. A radio-opaque element of known size 26 is shown adjacent the object to be measured 24. The image of the element 26 is shown at 32. As in FIG. 1, the images differ in size from the imaged objects because of the nonparallel pattern of radiation. However, simple geometry suffices to show that the size of each image differs from the size of the corresponding imaged object in the same proportion. That is, the length of 24 divided by the length of 30 is equal to the length of 26 divided by the length of 32. This relationship permits the true size of 24 to be readily calculated from the size of 30 and 32 provided that the size of 26 is also known. The element 26 provides a calibration standard, and if it is introduced in suitable proximity to the object 24, an accurate measurement can be made by the above-described computation of size ratios.

Figure 3:
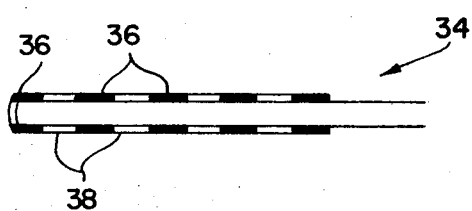
FIGS. 3 and 4 show one and two element catheters, respectively, of the invention.

FIG. 3 shows one practical embodiment of the invention. A catheter 34 having non-radio-opaque walls of woven dacron or nylon is provided with radio-opaque segments 36 by incorporating tantalum or other suitable radio-opaque substance into the catheter wall. The intervals 38 between segments 36 are non-radio opaque. Together the segments 36 and the intervals 38 provide a convenient direct-reading scale for comparison with objects within the body or in other inaccessible locations. For many medical applications it is convenient to make the radio-opaque segments one centimeter in length, and to make the intervals between them of the same size. However, a variety of other dimensional relationships could obviously be employed provided that the length of the radio-opaque segments and of the intervals between them is known.

The use of segments of equal length has the advantage of not requiring identification of the particular position of the catheter with respect to the object to be measured. Making the intervals of the same length as the radio-opaque segments avoids the need of computation and permits measurement by simple counting. However, there might be applications where the use of segments or intervals of known but varying length would facilitate measurement. For example, successive segments might increase the length by increments of one millimeter, and provided that a suitable index mark were provided and that there were room to introduce the probe to any desired position, measurement of fractional-centimeter dimensions could be facilitated.

Figure 4:
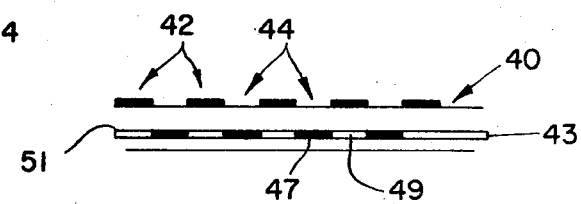

FIG. 4 shows an alternate embodiment which permits accurate measurement of fractional-centimeter dimensions in another way. An outer tubular element, catheter 40 is provided with multiple radio-opaque segments 42 alternating with non-radio-opaque intervals 44. An inner element, stylet 43 is provided with corresponding radio-opaque segments 47 (of the same length as intervals 44) spaced at intervals 49 (of the same length as segments 42). When the inner element 43 is located as shown in FIG. 4, radio-opaque segments 47 mask intervals 44 so that the entire probe is radio opaque. Scale 51 then reads zero.

Figure 5:
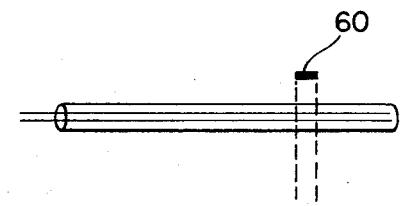
FIG. 5 shows the same two-element embodiment of the invention opened for the measurement of an inaccessible object.

FIG. 5 illustrates the use of the FIG. 4 embodiment to measure the length of object 60. The inner element 43 is pulled out from outer element 40 until the resulting non-radio-opaque windows are of the exact length of the object 60. The length of the object 60 can then be directly read from scale 51.

As in the single-element embodiment previously described it is usually convenient to make the segments and intervals equal, thus facilitating measurement of objects extending over more than one segment by direct counting.

The principles of the invention can be usefully applied to such problems as measurement of ventricular wall thickness, measurement of the length of a diseased segment of a coronary artery, degrees of stenosis of other vessels in conjunction with angiography, measurements in G.I. surgery, changes in the masses of tumors, healing of fractures, and a myriad of other medical applications. Nor are the uses necessarily confined to medical applications. Industrial uses for the measurement of inaccessible objects are also possible utilizing essentially similar structures.

Figure 6:
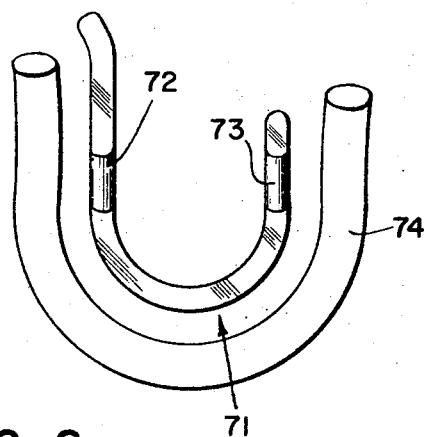
FIG. 6 is a diagrammatic representation of a catheter looped in the heart ventricle with the sides of the loop opposite the wall of the ventricle useful in measuring shortening velocities within the heart.

Referring to FIG. 6, there is shown a diagrammatic representation of a catheter 71 with opaque segments 72 and 73 looped in the heart ventricle 74 with the sides of the loop opposite the wall of the ventricle. With ventricular movement or contraction, the catheter movement can be observed through fluoroscopy, for example, as the sections of known dimension move relative to one another. The velocity of contraction of the ventricle in the plane of the catheter can be established by timed cine-radiographic recording systems. This technique is useful in measuring shortening velocities within the heart.

It is apparent that those skilled in the art may now make numerous uses of and departures from the specific apparatus and techniques described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Apparatus for the measurement of a dimension of objects illuminated by radiant energy comprising, insertable means including at least one segment of radio-opaque material of known dimension for insertion into a location beside an object to be measured, said insertable means comprising a tubular outer element surrounding an inner element adapted for axial movement with respect thereto, said outer element comprising at least one radio-opaque segment, said inner element comprising at least one radio-opaque segment, whereby axial movement of said inner element relative to said outer element can provide a nonradio-opaque region of said probe corresponding to the axial spacing between said radio-opaque segment of said outer element and said radio-opaque segment of said inner element, and means for measuring axial movement of said inner element relative to said outer element.

2. The apparatus of claim 1 and further comprising a plurality of radio-opaque segments of known dimension spaced at known intervals on said insertable means.

3. The apparatus of claim 2 wherein said segments are equal to each other and said intervals are equal to each other.

4. The apparatus of claim 3 wherein said segments are of the same dimension as said intervals.

5. The apparatus of claim 2 wherein the length of said segments is an integral number of millimeters and said intervals are also equal to an integral number of millimeters.

6. The apparatus of claim 1 wherein said insertable means is a catheter having a non-radio-opaque wall into which is incorporated said radio-opaque material.

7. The apparatus of claim 1 wherein said outer element comprises a plurality of radio-opaque segments of equal length axially spaced at equal outer-element intervals and said inner element comprises a plurality of radio-opaque segments of length equal to said outer-element intervals spaced at intervals equal to said length of said outer element segments, whereby said inner element can be moved from a first position wherein the radio-opaque segments of said inner element mask the non-radio-opaque intervals between the radio-opaque segments of said outer element and further positions wherein non-radio-opaque regions are created of length equal to the magnitude of the axial movement of said inner element from said first position.

8. The apparatus of claim 7 wherein said outer element and said inner element each comprise a plurality of radio-opaque segments of equal length alternating with non-radio-opaque intervals of length equal to the length of said radio-opaque segments.

* * * * *